United States Patent
Chuang et al.

(10) Patent No.: US 11,529,846 B2
(45) Date of Patent: Dec. 20, 2022

(54) ADAPTIVE AIR CONDITIONING SYSTEM FOR TRANSPORT CABIN, CONTROL METHOD FOR THE SYSTEM, AND CARRIER WITH THE SYSTEM

(71) Applicant: Mintron Energy Technology Co., Ltd., Taoyuan (TW)

(72) Inventors: Chia-Ming Chuang, Taoyuan (TW); Chen-Sheng Huang, Taoyuan (TW)

(73) Assignee: MINTRON ENERGY TECHNOLOGY CO., LTD., Taoyuan (TW)

( * ) Notice: Subject to any disclaimer, the term of this patent is extended or adjusted under 35 U.S.C. 154(b) by 326 days.

(21) Appl. No.: 16/764,758

(22) PCT Filed: Nov. 12, 2018

(86) PCT No.: PCT/CN2018/115018
§ 371 (c)(1),
(2) Date: May 15, 2020

(87) PCT Pub. No.: WO2019/137088
PCT Pub. Date: Jul. 18, 2019

(65) Prior Publication Data
US 2020/0398638 A1      Dec. 24, 2020

(30) Foreign Application Priority Data

Jan. 15, 2018  (CN) .......................... 201810035131.1

(51) Int. Cl.
G01M 1/38 (2006.01)
B60H 1/00 (2006.01)

(52) U.S. Cl.
CPC ..... B60H 1/00807 (2013.01); B60H 1/00014 (2013.01); B60H 1/00207 (2013.01);
(Continued)

(58) Field of Classification Search
CPC .............. B60H 1/00807; B60H 1/0014; B60H 1/00207; B60H 1/00321; B60H 1/00742;
(Continued)

(56) References Cited

U.S. PATENT DOCUMENTS

2017/0234608 A1* 8/2017 Sato .................. F25D 17/06
454/75
2017/0267066 A1* 9/2017 Hong ................ B60H 1/32281

FOREIGN PATENT DOCUMENTS

CN        106739926 A      5/2017
WO     2016029044 A1      2/2016

OTHER PUBLICATIONS

International Search Report of international application PCT/CN2018/115018, published on Jan. 30, 2019.

* cited by examiner

*Primary Examiner* — Davis D Hwu
(74) *Attorney, Agent, or Firm* — Che-Yang Chen; Law Office of Michael Chen

(57) ABSTRACT

An adaptive air conditioning system, a method for the system, and a carrier equipped with the system are disclosed. The carrier includes at least one adaptive air conditioning system. The carrier has a body, which includes at least one cabin defining a compartment for accommodating transported objects, such as passengers or cargos. The adaptive air conditioning system includes data collecting apparatus, temperature control apparatus, and a microcontroller. The temperature control apparatus includes a liquid circulation unit, an air circulation unit, and a control switch. With the adaptive air conditioning system, the air and internal installation in the compartment can be controlled at a predetermined temperature more promptly, efficiently, uniformly, (Continued)

and flexibly, thus increasing comfort level for the passengers or meeting the temperature requirements for the cargos.

6 Claims, 10 Drawing Sheets

(52) U.S. Cl.
CPC ..... *B60H 1/00321* (2013.01); *B60H 1/00742* (2013.01); *B60H 1/00885* (2013.01); *B60H 1/00371* (2013.01); *B60H 1/00392* (2013.01); *B60H 2001/00214* (2013.01); *B60H 2001/00228* (2013.01)

(58) Field of Classification Search
CPC ............ B60H 1/00885; B60H 1/00371; B60H 1/00392; B60H 2001/00214; B60H 2001/00228
USPC ........................................................ 700/276
See application file for complete search history.

ADAPTIVE AIR CONDITIONING SYSTEM FOR TRANSPORT CABIN, CONTROL METHOD FOR THE SYSTEM, AND CARRIER WITH THE SYSTEM

FIELD OF THE INVENTION

The present invention relates to an air conditioning system and, more particularly, to an adaptive air conditioning system for a transport cabin, a control method for the system, and a carrier with the system.

BACKGROUND OF THE INVENTION

Conventionally, air conditioning systems installed in transportation equipment, such as ships, trains, automobiles, and aircrafts, employ refrigerants to perform heat exchange, through which cold or hot air can be introduced into the cabin to adjust the air temperature in the cabin. Due to air having a low specific heat (about 1012 J/kg K), the air temperature inside the cabin of transportation equipment can be controlled easily to achieve a desired temperature. On the other hand, most of the cabin body is formed of metal; for example, the specific heat of steel is about 450 J/kg K, which is lower than air. As a consequence, the cabin body can absorb and release heat more quickly than the air within the cabin. This means that the cabin body is liable to be affected by its ambient temperature. For this reason, within several minutes, the temperature of the cabin body would come near to its ambient temperature. Besides, if the cabin body was exposed under strong sunlight, it could function as an oven. In tens of minutes, the temperature of the air in the cabin would be tens of degrees C. (Celsius) higher than the ambient temperature.

For a vehicle exposed under strong sunlight, a person may get burned when touching the vehicle body. This means that environmental conditions would have a great impact on the temperature of a vehicle. Since most vehicles have windows on their cabins, not only can the air in the cabin be directly heated by the sunlight, the internal installation, such as the steering wheel, dashboard, seats and storage boxes, within the cabin can also be heated by solar radiation, making the temperature of the entire vehicle abnormally high, as shown in FIG. 1. The Society of Automotive Engineers (SAE) paper 860591 reports that, under an ambient temperature (T1) of 39 degrees C., the air temperature (T2) within a vehicle cabin may reach 76 degrees C., wherein the internal installation within the cabin generally has a specific heat higher than air and metals. It is found that the temperature (T3) of the steering wheel can reach 93 degrees C. when it is exposed under the sunlight or immersed in hot air in the cabin.

When the vehicle cabin is at such a high temperature, even the driver has fully opened the windows and the air conditioner is operated at its full capacity, attempting to have the air in the cabin to be quickly cooled down. However, for various pieces of the internal installation in the cabin, due to a higher heat capacity, it usually takes about 20 minutes to have the internal installation pieces return to a normal temperature. For example, it takes an average of more than ten minutes to have the hot seats and steering wheels cool down to a level that ordinary people can tolerate. Generally, the vehicle cabin needs more time to achieve a comfort level for ordinary people. In particular, while passengers sit on hot seats and wait for the temperature in the cabin to gradually cool down, they have become thermal channels in cooling the seats. As a consequence, heat can be transferred from the seats to the passengers, thus increasing the discomfort. This accounts for part of a seat used in vehicles equipped with conventional air conditioning systems being preferably made of a material having a lower specific heat so as to accelerate the cooling effect.

By contrast, when a vehicle drives in a cold environment, after a certain period of time, the average temperature of the cabin body, the air and internal installation in the cabin will approach to the temperature of the external severe cold environment. To prevent temperature drop, the air conditioning system in the cabin can be turned on to perform a heating function. As such, although the air inside the cabin is easy to reach a desired temperature by the air conditioning system, due to a higher specific heat, it will take a long time to have the internal installation reach a predetermined level of warmth. This may cause discomfort to passengers in the vehicle and thus does not meet the requirements of a vehicle that claims to provide comfortable temperature.

For transportation equipment, due to the air and internal installation in the cabin and the cabin body having different heat capacities, an air conditioning system that performs temperature control only for the air in the cabin cannot achieve a good effect. Because the internal installation may cause the cabin to behave like an oven or freezer, it may take more time and energy to have the entire cabin to reach an ideal temperature. To improve the effect of temperature control, the air conditioning system should perform heat exchange with the internal installation to remove the effect of oven or freezer.

Conventional air conditioning systems, installed in fossil-fuel vehicles or electrically-driven vehicles, are lack of efficiency and comfort. For electrically-driven vehicles, the air conditioning system thereof is the most power consuming system except the power drive system, wherein the power consumed by the air conditioning system is continuous, and would become larger in the initial state of startup. According to statistics, long-time cooling operation of air conditioning systems of vehicles during summer, the mileage of the vehicles can be reduced by approximately 20-30%. On the other hand, heating operation on vehicle cabins through a positive temperature coefficient (PTC) thermistor during winter, the mileage of the vehicles can be reduced by approximately 30-40%.

Nevertheless, there is still room for improving the performance and comfort of transportation equipment, regardless of using fossil fuel or electricity. Particularly, for transportation equipment containing materials having different heat capacities, the present invention can achieve the objects: the air conditioning system can perform temperature control more efficiently; the temperature of all parts of the cabin can be adjusted more uniformly; the air conditioning system can perform temperature control more promptly and flexibly to provide more comfort for passengers and meet the temperature requirements for cargos.

SUMMARY OF THE INVENTION

One object of the present invention is to provide an adaptive air conditioning system for a cabin of a carrier, which includes a liquid circulation unit and an air circulation unit to facilitate adjusting the air temperature in the cabin and the temperature of internal installation in the cabin, so that all parts of the cabin can be controlled at an ideal, uniform temperature more quickly and effectively.

Another object of the present invention is to provide an adaptive air conditioning system for a cabin of a carrier, which includes data collecting apparatus to measure temperatures of the air, internal installation, and transported objects in the cabin, whereby thermal energy change of the cabin, a temperature trend associated the energy change, and temperature differences between the temperatures measured by the data collecting apparatus and a predetermined temperature can be calculated, by which the liquid circulation unit and/or the air circulation unit can be started to smartly perform temperature control for the cabin.

A further object of the present invention is to provide an adaptive air conditioning system for a cabin of a carrier, wherein the internal installation in the cabin can be provided with a phase change material so as to improve the performance of the air conditioning system.

A still further object of the present invention is to provide a method for an adaptive air conditioning system for a cabin of a carrier, whereby the air conditioning system extensively collects temperature data and smartly performs temperature control for the cabin to achieve accurate, dynamic result, adaptive results.

A yet still further object of the present invention is to provide a carrier equipped with an adaptive air conditioning system that allows a cabin of the carrier to be controlled at a predetermined temperature to increase comfort level for passengers or meet the temperature requirements for cargos.

A yet still further object of the present invention is to provide a carrier equipped with an adaptive air conditioning system including a liquid circulation unit, wherein a cabin of the carrier is provided with a connection port communicating with the liquid circulation unit, whereby when the carrier is stopped at a stop station, the liquid circulation unit can be connected with an external heat exchange tank to perform temperature control for the cabin, even though the power of the carrier has been turned off.

The present invention provides an adaptive air conditioning system for a cabin of a carrier that defines a compartment for accommodating at least one transported object for controlling the air and internal installation in the compartment at a predetermined temperature. The adaptive air conditioning system comprises data collecting apparatus, temperature control apparatus, and a microcontroller. The data collecting apparatus includes at least one internal installation temperature sensor, at least one compartment temperature sensor, and at least one object sensor. The internal installation temperature sensor can measure temperature of the internal installation and output signals representative of the temperature of the internal installation. The compartment temperature sensor can measure temperature of the air in the compartment and output signals representative of the temperature of the air in the compartment. The object sensor can sense condition of the transported object and output signals representative of the condition of the transported object. The temperature control apparatus includes at least one liquid circulation unit, at least one air circulation unit, and at least one control switch for starting the liquid circulation unit and the air circulation unit, wherein the liquid circulation unit is thermally connected to at least one piece of the internal installation while the air circulation unit is thermally connected to the compartment. The microcontroller can receive the signals outputted from the internal installation temperature sensor, the compartment temperature sensor, and the object sensor, and can decide whether or not to enable the temperature control apparatus according to temperature differences between the temperatures measured by the sensors and the predetermined temperature in view of temperature trends based on thermal energy changes in the cabin, and can command the control switch to start the liquid circulation unit and/or the air circulation unit according to the temperature differences if the temperature control apparatus is enabled.

Furthermore, the present invention provides a carrier equipped with at least one adaptive air conditioning system that includes data collecting apparatus, temperature control apparatus, and a microcontroller. The carrier includes at least one cabin that defines a compartment for accommodating at least one transported object. The air conditioning system, which can control the air and internal installation in the compartment at a predetermined temperature, includes data collecting apparatus, temperature control apparatus, and a microcontroller. The data collecting apparatus includes at least one internal installation temperature sensor, at least one compartment temperature sensor, and at least one object sensor, wherein the internal installation temperature sensor can measure temperature of the internal installation and output signals representative of the temperature of the internal installation; the compartment temperature sensor can measure temperature of the air in the compartment and output signals representative of the temperature of the air in the compartment; the object sensor can sense condition of the transported object and output signals representative of the condition of the transported object. The temperature control apparatus includes at least one liquid circulation unit, at least one air circulation unit, and at least one control switch for starting the liquid circulation unit and the air circulation unit, wherein the liquid circulation unit is thermally connected to at least one piece of the internal installation while the air circulation unit is thermally connected to the compartment. The microcontroller receives the signals outputted from the internal installation temperature sensor, the compartment temperature sensor and the object sensor, and decides whether or not to enable the temperature control apparatus according to temperature differences between the temperatures measured by the sensors and the predetermined temperature in view of temperature trends based on thermal energy changes in the cabin, and commands the control switch to start the liquid circulation unit and/or the air circulation unit according to the temperature differences if the temperature control apparatus is enabled.

Furthermore, the present invention provides a method for an adaptive air conditioning system for a cabin of a carrier that defines a compartment for accommodating at least one transported object for controlling the air and internal installation in the compartment at a predetermined temperature, wherein the adaptive air conditioning system includes data collecting apparatus, temperature control apparatus, and a microcontroller, the data collecting apparatus including at least one internal installation temperature sensor, at least one compartment temperature sensor, and at least one object sensor, the internal installation temperature sensor capable of measuring temperature of the internal installation and outputting signals representative of the temperature of the internal installation, the compartment temperature sensor capable of measuring temperature of the air in the compartment and outputting signals representative of the temperature of the air in the compartment, the object sensor capable of sensing condition of the transported object and outputting signals representative of the condition of the transported object, the temperature control apparatus including at least one liquid circulation unit, at least one air circulation unit, and at least one control switch for starting the liquid circulation unit and the air circulation unit, the liquid circulation unit being thermally connected to at least one piece of the internal installation while the air circulation unit being thermally connected to the compartment. The method comprises the steps of: (a) configuring the microcontroller to receive the signals representative of the temperature of the internal installation sent from the internal installation temperature sensor, the signals representative of the temperature of the air in the compartment sent from the compartment temperature sensor, and the signals representative of the condition of the transported object sent from the object sensor; (b) configuring the microcontroller to estimate thermal energy changes in the cabin according to the signals sent from the sensors; and (c) configuring the microcontroller to estimate temperature trends of the cabin according to the thermal energy changes, and to calculate temperature differences between the temperatures measured by the sensors and the predetermined temperature, and to decide whether or not to enable the temperature control apparatus according to the temperature differences in view of the temperature trends, and to command the control switch to start the liquid circulation unit and/or the air circulation unit according to the temperature differences if the temperature control apparatus is enabled.

The adaptive air conditioning system of the present invention, which comprises data collecting apparatus, temperature control apparatus, and a microcontroller, is featured in extensive temperature data collection for estimating thermal energy change of the cabin and a temperature trend associated with the energy change, and calculating temperature differences between the measured temperatures and a predetermined temperature. These calculated data can serve as a basis for starting the temperature control apparatus, so that temperature control for the cabin can be performed more quickly, efficiently, uniformly, and smartly. Secondly, the air conditioning system is featured in that some pieces of the internal installation in the cabin can be provided with a phase change material to increase the performance of the air conditioning system. Thirdly, the air conditioning system can provide more comfort for passengers or meet the temperature requirements for cargos in the transportation equipment. Fourthly, the air conditioning system can be connected with an external heat exchange tank at a stop station to perform temperature control even though the power of the transportation equipment is turned off.

The foregoing and other features and advantages of illustrated embodiments of the present invention will be more readily apparent from the following detailed description, which proceeds with reference to the accompanying drawings.

DETAILED DESCRIPTION OF THE ILLUSTRATED EMBODIMENTS

The foregoing and other technical contents, features and advantages of the present invention will be illustrated in detail by way of exemplary embodiments in the following paragraphs with reference to the accompanying drawings. In the exemplary embodiments, same elements will be indicated by similar numerals or labels. In the present invention, a carrier means a piece of transportation equipment, such as a vehicle or a ship, which can take objects therein.

Figure 1:
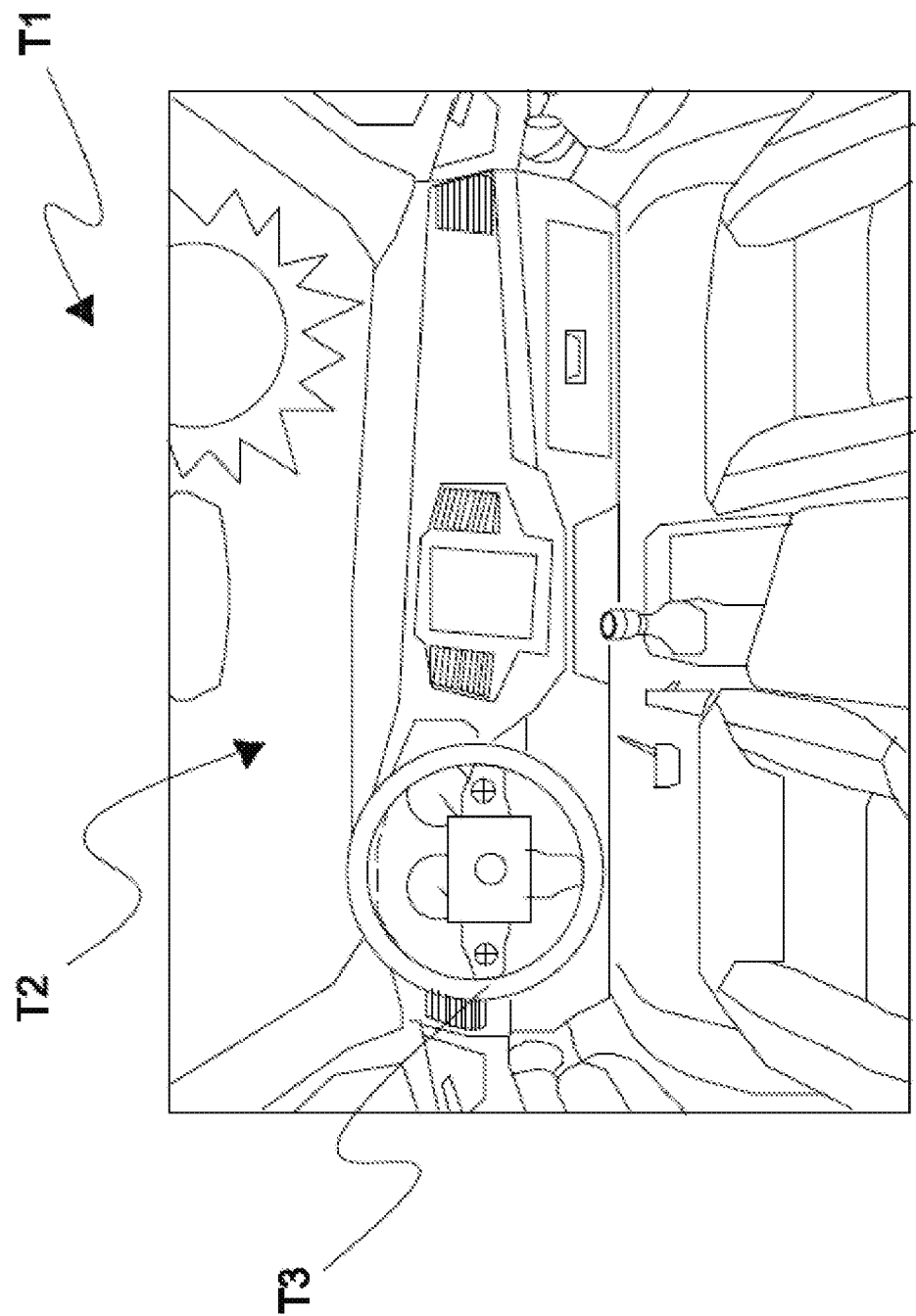
FIG. 1 shows a schematic view of the interior of a driver cabin of a vehicle, wherein the air and internal installation in the cabin are heated by the sunlight shining through the windshield.
Figure 2:
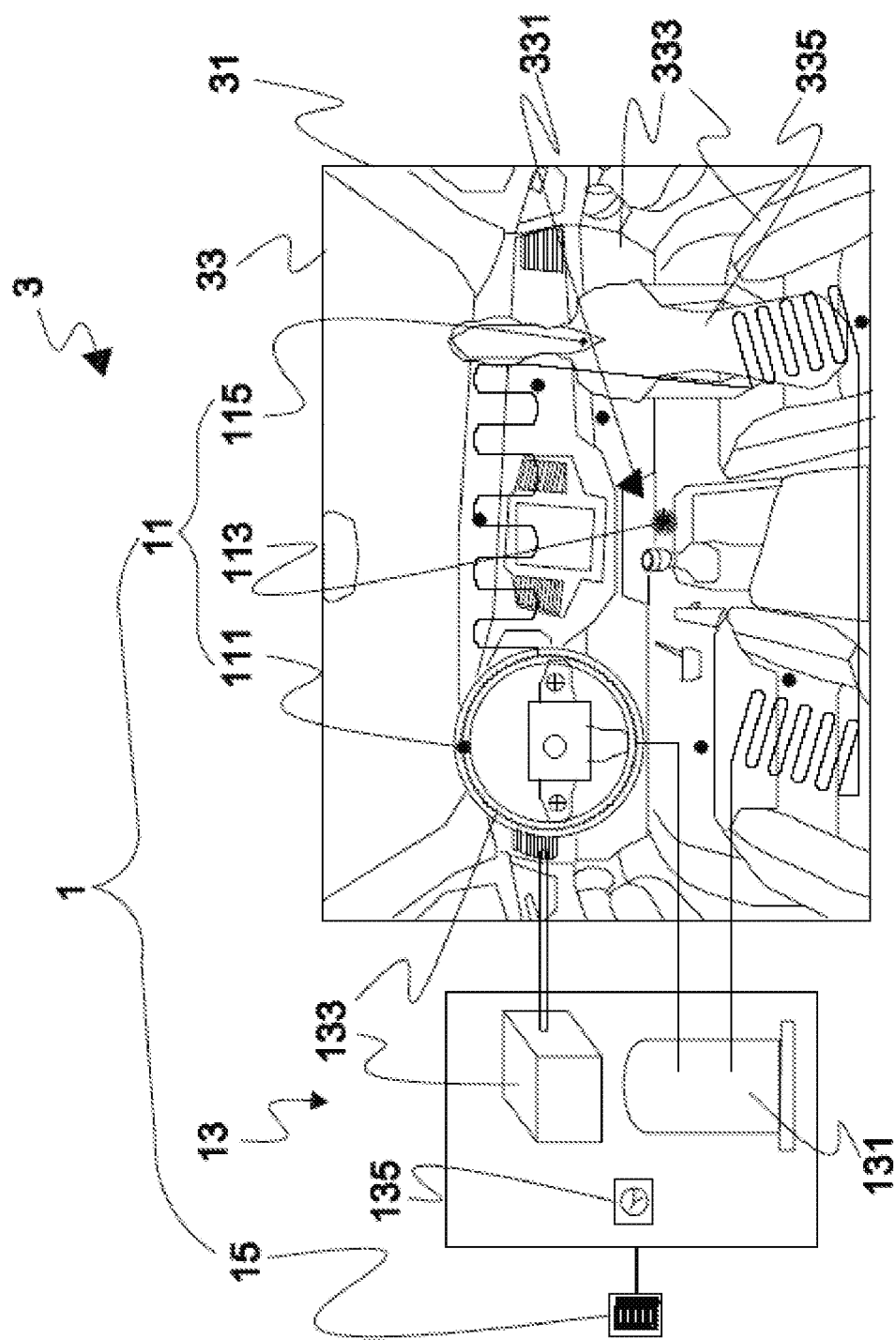
FIG. 2 shows a schematic view of a control architecture for an air conditioning system of the present invention, wherein various control elements of the system are briefly presented.
Figure 3:
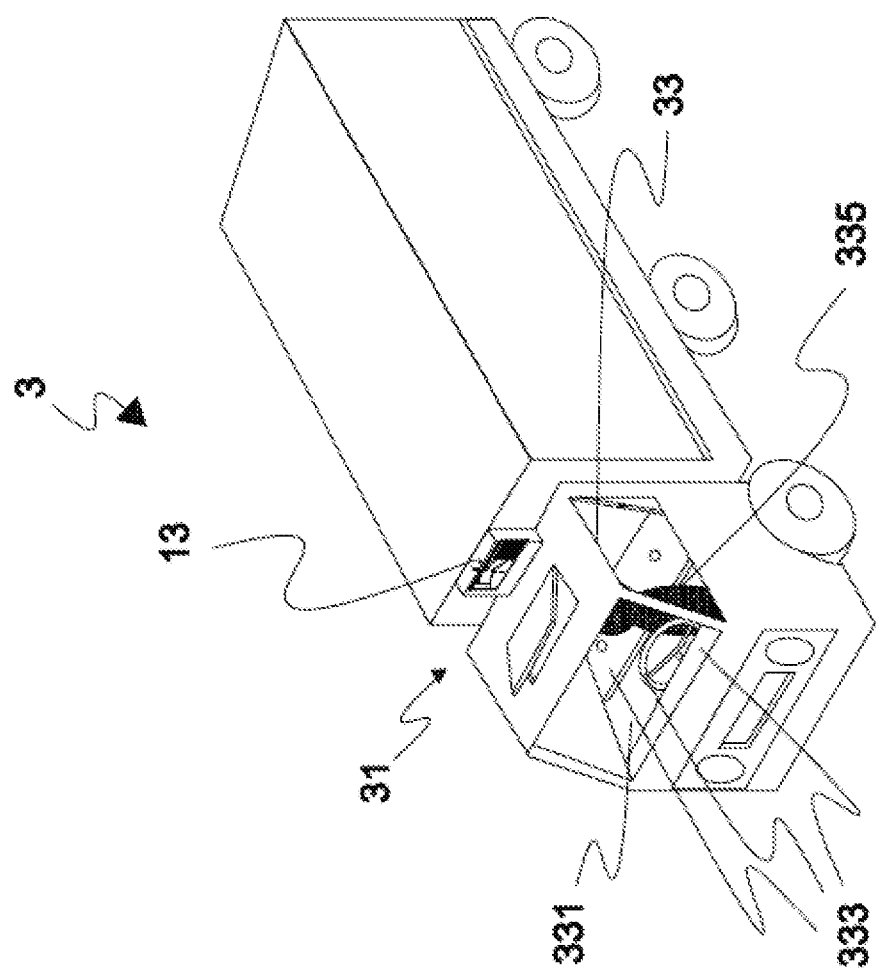
FIGS. 3 and 4 show 3-dimensional schematic views of a transport cabin according to a first embodiment of the present invention, wherein various elements of the truck are presented.
Figure 4:
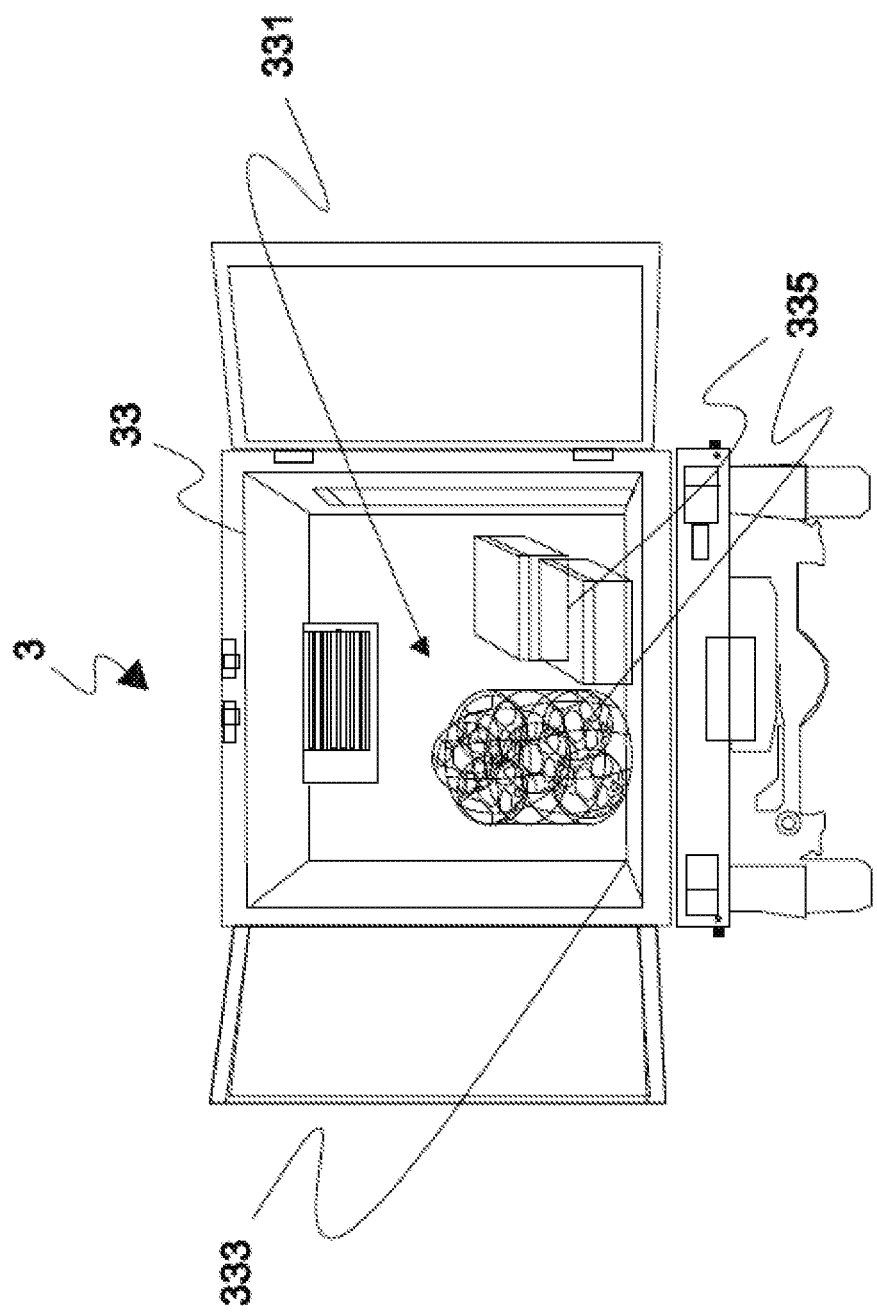
Figure 5:
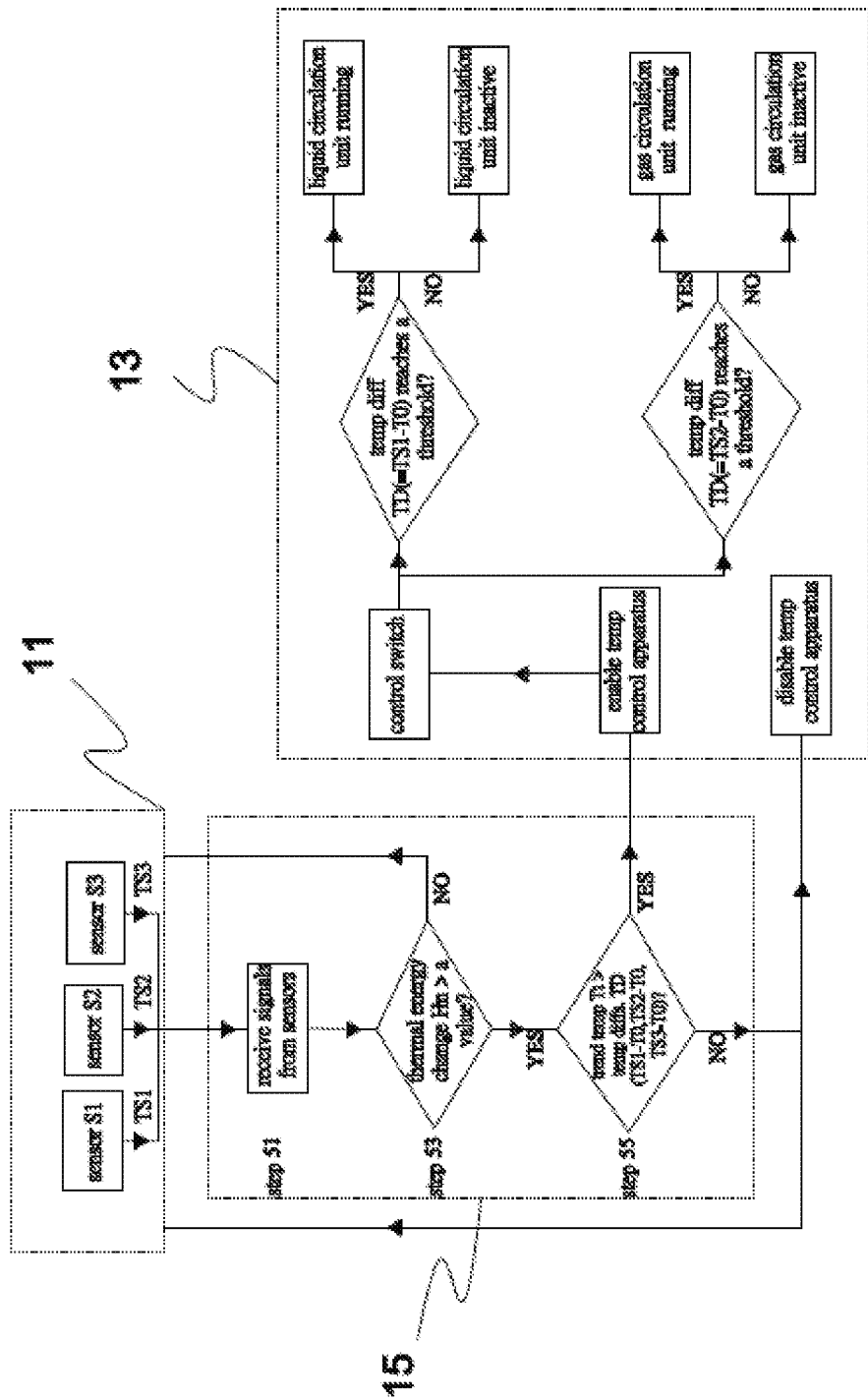
FIG. 5 shows a flowchart, which illustrates a control methodology for the air conditioning system of the first embodiment.

Referring to FIG. 2, in conjunction with FIGS. 3 through 5 showing a first embodiment of the present invention, a carrier 3, such as a fresh transport cabin, includes a body 31 furnished with an adaptive air conditioning system 1. The body 31 has two cabins 33, each of which can accommodate at least one transported object 335, wherein the front cabin (driver cabin) provides for a driver, whereas the rear cabin is a freight or cargo container. The cabins 33 each define a compartment 331, in which internal installation (i.e. facilities/furnishings) 333 is provided, including a plurality of objects, such as seats, dashboard, steering wheel, storage boxes, carpets, ceiling decorations, internal walls, and so on. The transported object in the front cabin refers to the driver, whereas the transported object in the rear cabin refers to the fresh goods. The adaptive air conditioning system 1 is used to keep the air in the compartments 331 together with the internal installation 333 at a predetermined temperature T0.

The adaptive air conditioning system 1 includes data collecting apparatus 11, temperature control apparatus 13, and a microcontroller 15, wherein the data collecting apparatus 11 includes at least one internal installation temperature sensor 111, at least one compartment temperature sensor 113, and at least one object sensor 115. The internal installation temperature sensor 111 can measure temperature of the internal installation 333 inside the compartment and output signals (S1) representative of the temperature. The compartment temperature sensor 113 can measure temperature of the air in the compartment 331 and output signals (S2) representative of the temperature. The object sensor 115 can measure temperature of the transported object 335 and output signals (S3) representative of the temperature.

The temperature control apparatus 13 includes at least one liquid circulation unit 131, at least one air circulation unit 133, and at least one control switch 135 for starting the liquid circulation unit 131 and/or the air circulation unit 133. The liquid circulation unit 131 is thermally connected to one or more pieces of the internal installation 333, so that the temperature of the internal installation can be adjusted when necessary. The air circulation unit 133 is thermally connected to the compartment 331, so that heat exchange with the air in the compartment 331 can be performed to adjust the temperature in the compartment 331.

In operation of the air conditioning system 1, the microcontroller 15 continuously receives the signals (S1, S2, S3) from the internal installation temperature sensor 111, the compartment temperature sensor 113, and the object sensor 115. By comparing two consecutive measurements for each sensor, i.e. the latest signals and the second latest previous signals, a thermal energy change (Hn) can be obtained from the specific heat and mass of the internal installation 333, the air and the transported object 335, which in turn can be used to estimate a temperature trend (Tt) (a potential temperature change resulted from the energy change) based on the specific heat and mass of the internal installation, the air in the compartment 333, or the transported object 335. Also, temperature differences (TD) between the temperatures (TS1, TS2, TS3) corresponding to the signals (S1, S2, S3) and a predetermined temperature (T0) can be calculated. According to the temperature differences (TD) and the temperature trend (Tt), the microcontroller 15 enables or disables the temperature control apparatus 13. For example, when the temperature trend (Tt) is greater than the temperature difference (TD) between the temperature (TS2) in the compartment and the predetermined temperature (T0) (i.e. Tt>TD), the temperature control apparatus 13 can be enabled.

After the temperature control apparatus 13 has been enabled by the microcontroller 15, the liquid circulation unit 131 and/or the air circulation unit 133 can be started by the control switch 135 according to the temperature difference (TD) between the temperature (TS1) corresponding to the signals (S1) from the internal installation temperature sensor 111 and a predetermined temperature (T0), and the temperature difference (TD) between the temperature (TS2) corresponding to the signals (S2) from the compartment temperature sensor 113 and the predetermined temperature (T0). For example, the sunlight shining on a seat (a piece of the internal installation) will cause the temperature of the seat to rise. If the temperature difference (TD) between the seat temperature and the predetermined temperature (T0) has reached a threshold, the microcontroller 15 can command the control switch 135 to start the liquid circulation unit 131. As to the compartment, if the temperature difference (TD) between the temperature of the air in the compartment and a predetermined temperature (T0) has reached a threshold, the microcontroller 15 can command the control switch 135 to start the air circulation unit 133. Of course, if both of the seat temperature and the air temperature have exceeded their corresponding predetermined temperature (T0) by a threshold, both the liquid circulation unit 131 and the air circulation unit 133 can be started at the same time.

In addition, the microcontroller 15 may increase or decrease the heat exchange power of the liquid circulation unit 131 and/or the heat exchange power of the air circulation unit 133 according to the temperature trend (Tt) so as to improve the effectiveness of the air conditioning system 1. For example, when the temperature trend (Tt) is high, the cooling power of the liquid circulation unit 131 or the air circulation unit 133 can be increased. The cooling power of the two units can be adjusted individually or simultaneously without hindering implementation of the present invention.

In the first embodiment, the driver seat, dashboard, steering wheel, storage boxes, carpets, ceiling decorations, and interior walls, which belong to the internal installation, each can be installed with their internal installation temperature sensors 111; the two compartments of front and rear cabins each can be installed with compartment temperature sensors 113 at their centers for measuring the corresponding air temperatures; the surface temperatures of the driver and the cargos can be measured by the object sensors 115. The air conditioning system 1 starts when the fresh transport cabin starts. FIG. 5 shows a flowchart, which provides a methodology for temperature control. In step 51, the signals associated with the internal installation, the air in the compartments, and the transported objects can be sent to the microcontroller 15 at intervals. The signals measured at one time can be temporarily stored in the microcontroller 15 so that they can be compared with the signals measured at a next time.

In summer, the fresh transport cabin, which loads fresh goods from the storage center, usually travels under the strong sunlight to deliver the goods to customers. When the truck arrives at a delivery place, the driver gets out of the truck and opens the door of the cargo compartment, during which the cold air in the truck may exchange with the hot air in the external environment. As a result, the temperature in the compartment 331 of the truck may rise. Meanwhile, the radiant heat of the sun may enter the truck through the window glass so that the internal installation 333 in the compartment exposed under the sunlight can receive high thermal energy. Also, the heat transferred by the sunlight can be conducted to the cabin through the truck body to further increase the temperature of the compartment 331.

In step 53, a thermal energy change in each part of the internal installation 333, the compartment 331, and the transported objects 335 can be estimated according to the temperature difference between two consecutive measurements, the mass, and the specific heat associated therewith. A net thermal energy change (Hn) can be obtained by adding the three parts of thermal energy change. If the net thermal energy change (Hn) exceeds a value, further considerations need to be performed in step 55, wherein a temperature trend (Tt) can be estimated from the net thermal energy change (Hn), and the specific heat and mass of a piece of the internal installation 333 associated with an internal installation temperature sensor 111. Also, a temperature difference (TD) between the temperature of the piece of the internal installation and a predetermined temperature (T0) can be obtained. According to the temperature trend (Tt) and the temperature difference (TD), the microcontroller 15 decides whether or not to enable the temperature control apparatus 13. For example, if the temperature trend (Tt) is greater than the temperature difference (TD), then the temperature control apparatus 13 can be enabled.

According to temperature differences (TD), the microcontroller 15 commands the control switch 135 to start the liquid circulation unit 131 and/or the air circulation unit 133. More specifically, if the temperature difference (TD) between the temperature (TS1) measured by the internal installation temperature sensor 111 and a predetermined temperature (T0) reach a threshold, the liquid circulation unit 131 can be started so that the temperature of the piece of the internal installation 333 can be decreased. The heat exchange liquid used in the liquid circulation unit 131 can be pure water, which has a specific heat (about 4200 J/Kg K) greater than air. Therefore, the liquid circulation unit 131 can absorb heat from the piece of the internal installation 333, such as seats, dashboard, steering wheel, storage boxes, carpets, ceiling decorations and internal walls, more quickly than the air circulation unit 133, so that the piece of the internal installation 333 can quickly return to the predetermined temperature (T0). Of course, other heat exchange liquids having a high specific heat, or even other materials that changes phase by absorbing the latent heat, can be used in the liquid circulation unit without hindering implementation of the present invention.

The liquid circulation unit 131, which facilitates heat exchange operation, employs a circulation tube that is thermally connected to one or more pieces of the internal installation 333. For example, the sunlight may cause a seat's back or pad to reach a high temperature, which can be quickly reduced by the circulation tube of the liquid circulation unit 131, thus alleviating discomfort to the passenger. In addition, the circulation tube may run through the top of the cargo compartment. As such, not only can the temperature of the wall of the cargo compartment be lowered, the heat from outside environment or solar radiation can be blocked from entering the vehicle. As a result, the air temperature close to the wall of the cargo compartment is substantially the same as the temperature at the center of the cargo compartment 331, thus increasing the quality of the fresh goods. On the other hand, if the temperature difference (TD) between the air temperature (TS2) of the compartment corresponding to the signals (S2) and a predetermined temperature (T0) reaches a threshold, the air circulation unit 133 can be started to reduce the air temperature of the compartment 331.

Of course, if the temperature difference (TD) between the temperature (TS1) associated with the signals (S1) and a predetermined temperature (T0) reaches a threshold, and the temperature difference (TD) between the temperature (TS2) associated with the signals (S2) and a predetermined temperature (T0) reaches a threshold, both the liquid circulation unit 131 and the air circulation unit 133 can be started at the same time. In addition, the microcontroller 15 may command the liquid circulation unit 131 and/or the air circulation unit 133 to increase or decrease their heat exchange power according to the temperature trend (Tt), that is to say, as the trend temperature increases, the cooling power of the liquid circulation unit and/or the cooling power of the air circulation unit is adjusted to increase and vice versa. As such, the two circulation units can be controlled more flexibly, intelligently, and promptly, thereby increasing the performance and benefit of the air conditioning system 1.

Of course, those skilled in the art can set values to the predetermined temperatures (T0) and the thresholds as comparison for starting the circulation units, wherein the predetermined temperatures (T0) for the internal installation, the air in the compartment and the transported objects can be set at the same value or different values; the thresholds can be set at the same value or different values. In this embodiment, the truck has two compartments 331: the front compartment (driver cabin) and the rear compartment (cargo cabin). The predetermined temperature (T0) for the front compartment can be set at a temperature that is comfortable to human beings. The predetermined temperature (T0) for the rear compartment can be set at freezing point. The predetermined temperatures (T0) for the two compartments and the thresholds can be set individually. With the present invention, the compartments can be controlled within 1 degree C. deviation of an ideal temperature.

In this embodiment, the carrier 3 is a fresh transport cabin, and its transported objects 335 refer to the driver and the fresh cargos. Different drivers may have different physiological conditions. Also, different cargos may have different temperature requirements. For example, some cargos have no restrictions on the temperature whereas other cargos, such as biological materials or transplanted organs, should be kept at an extremely low temperature, which require the truck to be equipped with a freezer. For a truck, the predetermined temperature (T0) and the thresholds associated with starting the circulation units of the air conditioning system can be set according to the requirement of the objects to be transported, without hindering implementation of the present invention.

Figure 6:
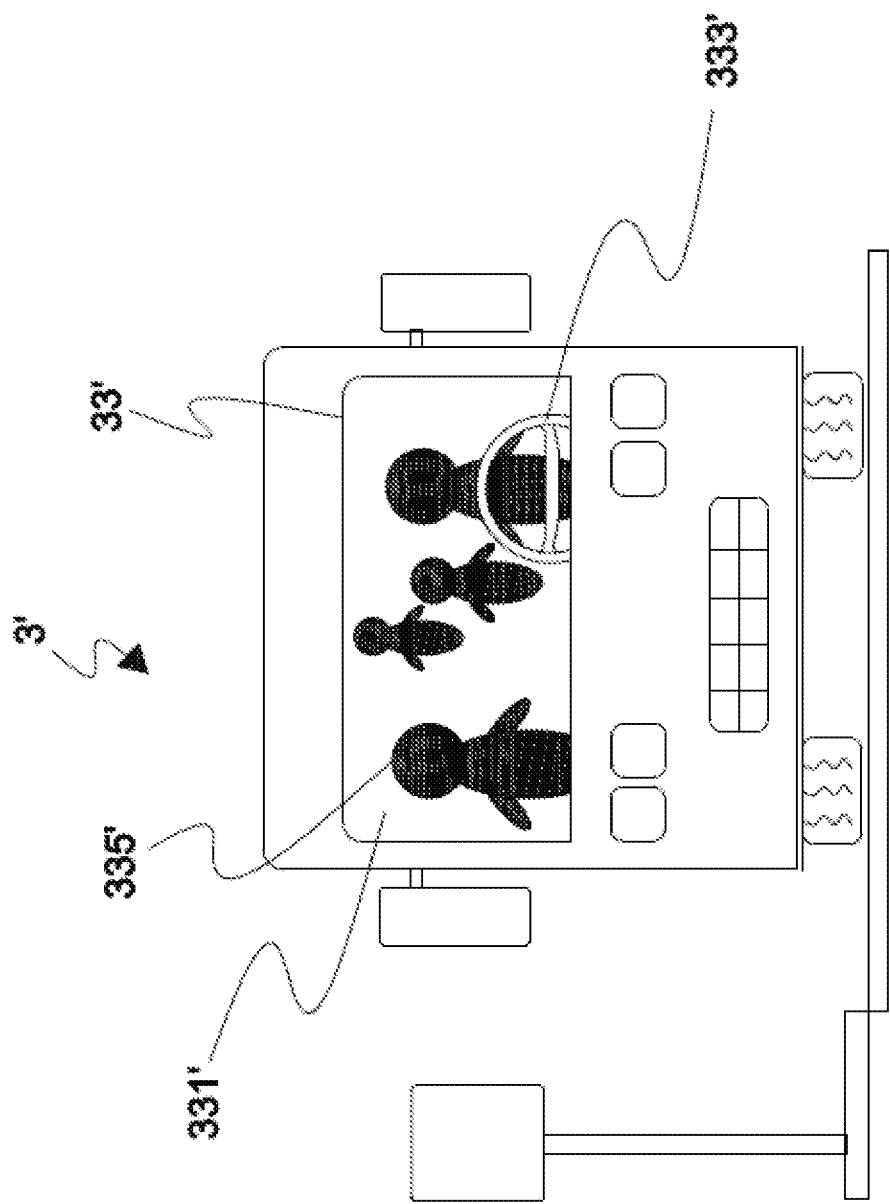
FIGS. 6 and 7 show schematic views of an electric bus according to a second embodiment of the present invention, wherein various control elements of the system are briefly indicated.
Figure 7:
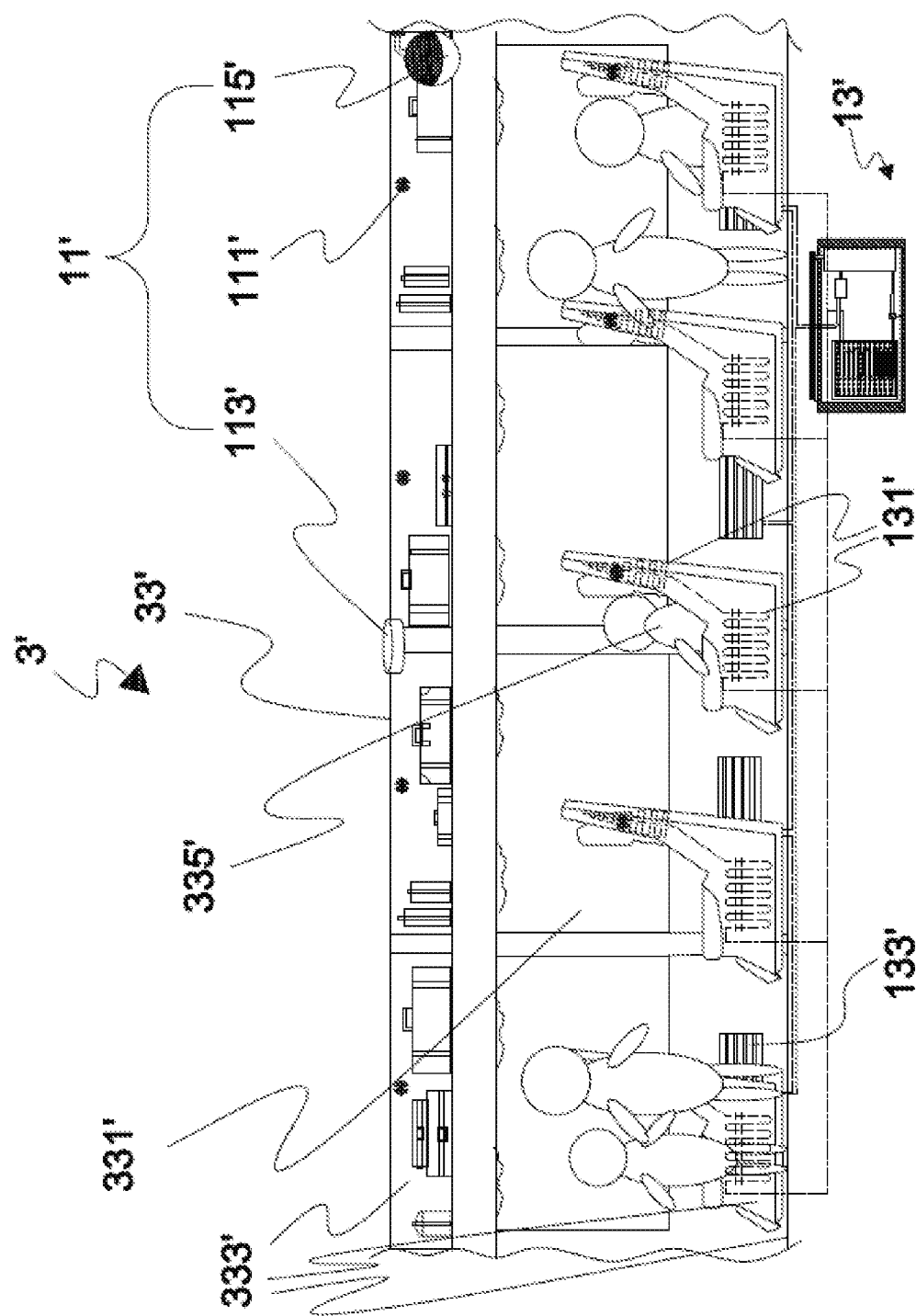
Figure 8:
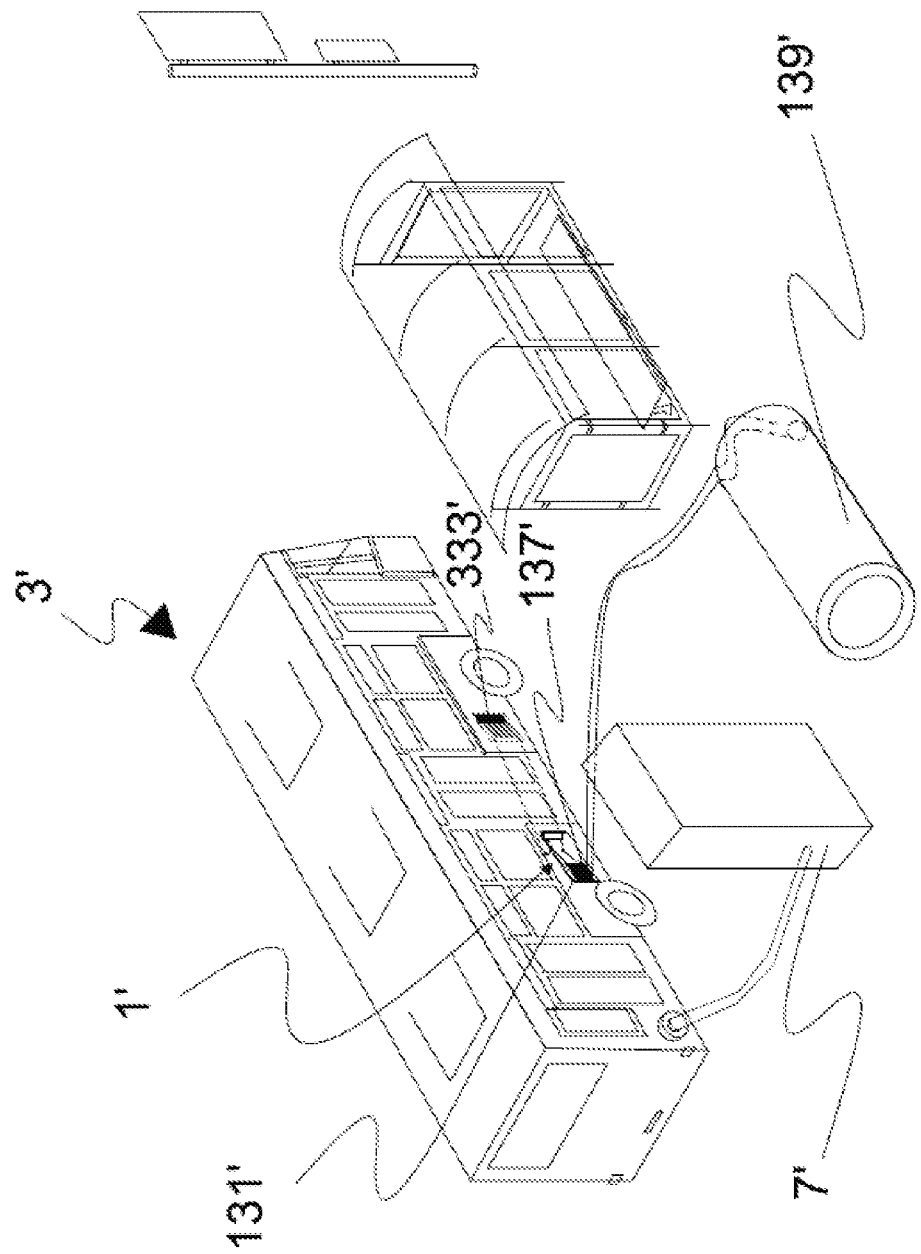
FIG. 8 shows a 3-dimensional schematic view of the second embodiment, wherein the electric bus is stopped at a bus stop station for charging, and connected with an external heat exchange tank.

FIGS. 6 through 8 shows a second embodiment of the present invention, wherein the carrier 3' is an electric bus 3', which has a cabin 33' defining a compartment 331 for accommodating a driver and passengers, who are referred to as the transported objects 335'. To save space, the contents of this embodiment that are the same as those of the previous embodiment are not illustrated in detail. The following paragraphs will focus on aspects that are different from the previous embodiment. In this embodiment, the electric bus is scheduled to travel on a fixed route. The speed of the electric bus is substantially fixed every day, wherein the air conditioning system of the bus consumes the most of the electrical power except for the driving system of the bus. The electrical power consumed by the air conditioning system is greatly affected by the ambient temperature and the number of passengers in the bus.

In the electric bus, various pieces of the internal installation 333', such as the steeling wheel, dashboard, seats, handrails, floor, ceiling decorations, and battery boxes, are installed with internal installation sensors 111'. The compartment 331' is installed at a center thereof with a compartment temperature sensor 113'. An object sensor 115' is a counter, which is installed above a door of the electric bus. The thermal energy released from the passengers in the bus can be obtained by multiplying the average body surface release energy by the number of passengers. Of course, more than one counter can be installed at different locations of the bus, without hindering implementation of the present invention. The temperature data measured by the sensors can be sent to the microcontroller (not labeled) at intervals until the bus is stopped. The data sent to the microcontroller each time can be saved temporarily to be compared with the data sent the next time. Before driving the bus on a road, the internal installation temperature sensors 111', the compartment temperature sensor 113', and the object sensor 115' can be turned on together with the air conditioning system to achieve an entire, preparatory temperature control for the electric bus. However, if the bus is stayed in a place with better shadowing conditions, the sensors together with the air conditioning system can be started after the bus is started, and this would not hinder implementation of the present invention.

When the microcontroller receives the signals (S1') from the internal installation temperature sensors 111', the signals (S2') from the compartment temperature sensor 113', and the signals (S3') from the object sensor 115', a control procedure and decision criterion as illustrated in the first embodiment can be performed, wherein the microcontroller decides whether or not to enable the temperature control apparatus 13'. If the temperature control apparatus 13' is enabled, a control switch (not labeled) can be turned on to start the liquid circulation unit 131' and/or the air circulation unit 133' according to temperature differences (TD) between the temperatures measured by the sensors and a predetermined temperature (T0). On daily travel of the electric bus, because of passengers frequently getting on and off and changes in the ambient temperature, the temperature within the electric bus may fluctuate violently. For this reason, the data collecting apparatus 11' has to measure temperature more densely and quickly, which allows the microcontroller to make a decision more promptly to enable or disable the temperature control apparatus 13'. Thereafter, the microcontroller may turn on the control switch to start the liquid circulation unit 131' and/or the air circulation unit 133' according to the temperatures measured at the internal installation 333' and the compartment 331'. As such, the air conditioning system 1' of the present invention can perform sensing, estimation, and temperature control in a repeated way, thus achieving the purpose of adaptive control.

FIG. 8 shows a bus stop station equipped with a heat exchange tank 137' and a charging stand 7' next to the tank, wherein the liquid in the heat exchange tank 137' is maintained at a predetermined temperature (T0'). The electric bus 3' has a connection port 137' communicating with the liquid circulation unit 131'. It is known that, while a vehicle is being charged, the vehicle's power system has to be turned off. Thus, during the charging process, there is no power supply for the air condition system thereof, so that the temperature within the vehicle is directly affected by the ambient temperature. By contrast, when the electric bus is stopped at the bus stop station for charging, at the same time, the liquid circulation unit 131' can be connected to the heat exchange tank 139' via the connection port 137'. By connection of the heat exchange tank 139', the temperature of the internal installation 333' can be adjusted in advance. Upon the electrical bus being started for a next transport service, the temperature within the electric bus can be maintained at a comfortable level, and furthermore, the battery pack can be protected from high temperature while the bus is being charged. Therefore, the service life and electrical storage performance of the battery pack can be increased.

Figure 9:
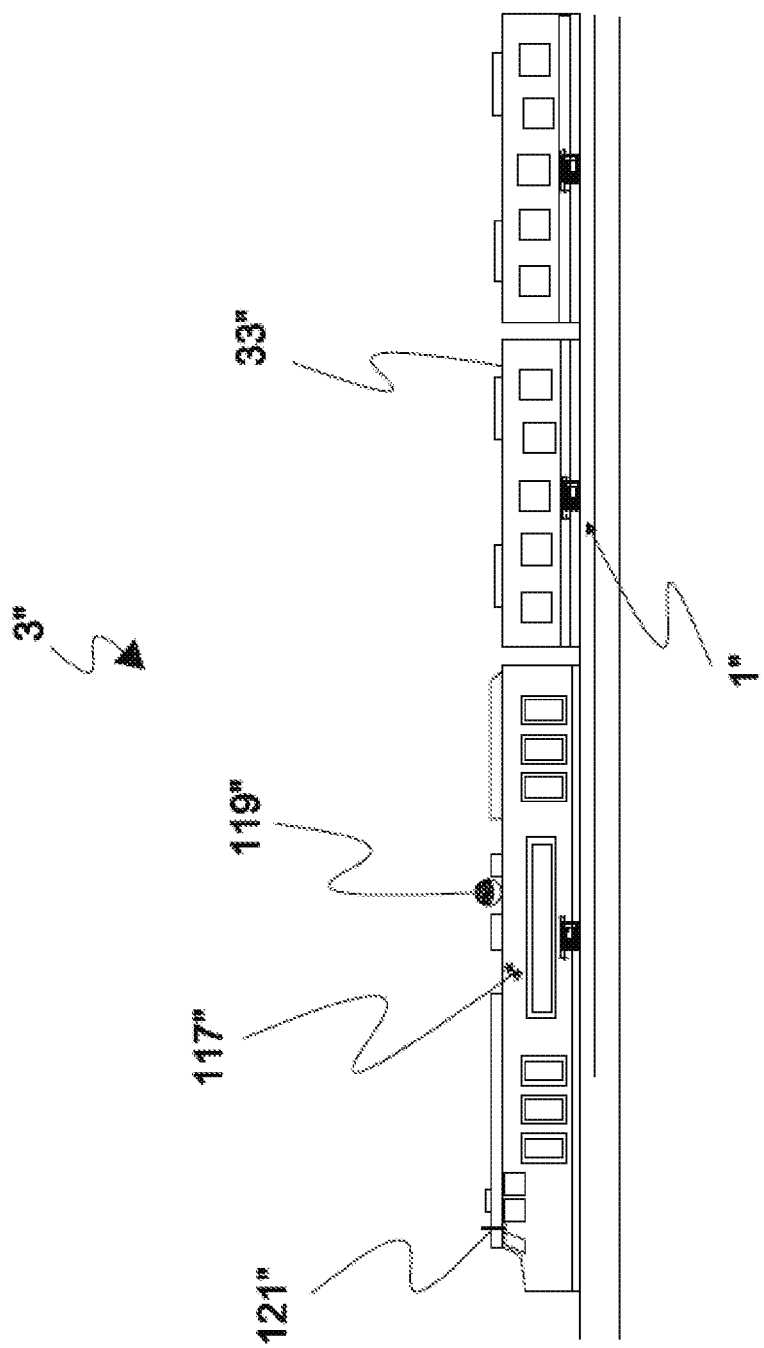
FIG. 9 shows a schematic view of a train according to a third embodiment of the present invention, wherein the air conditioning system of the train includes an ambient temperature sensor, a GPS receiver, and a communication device.
Figure 10:
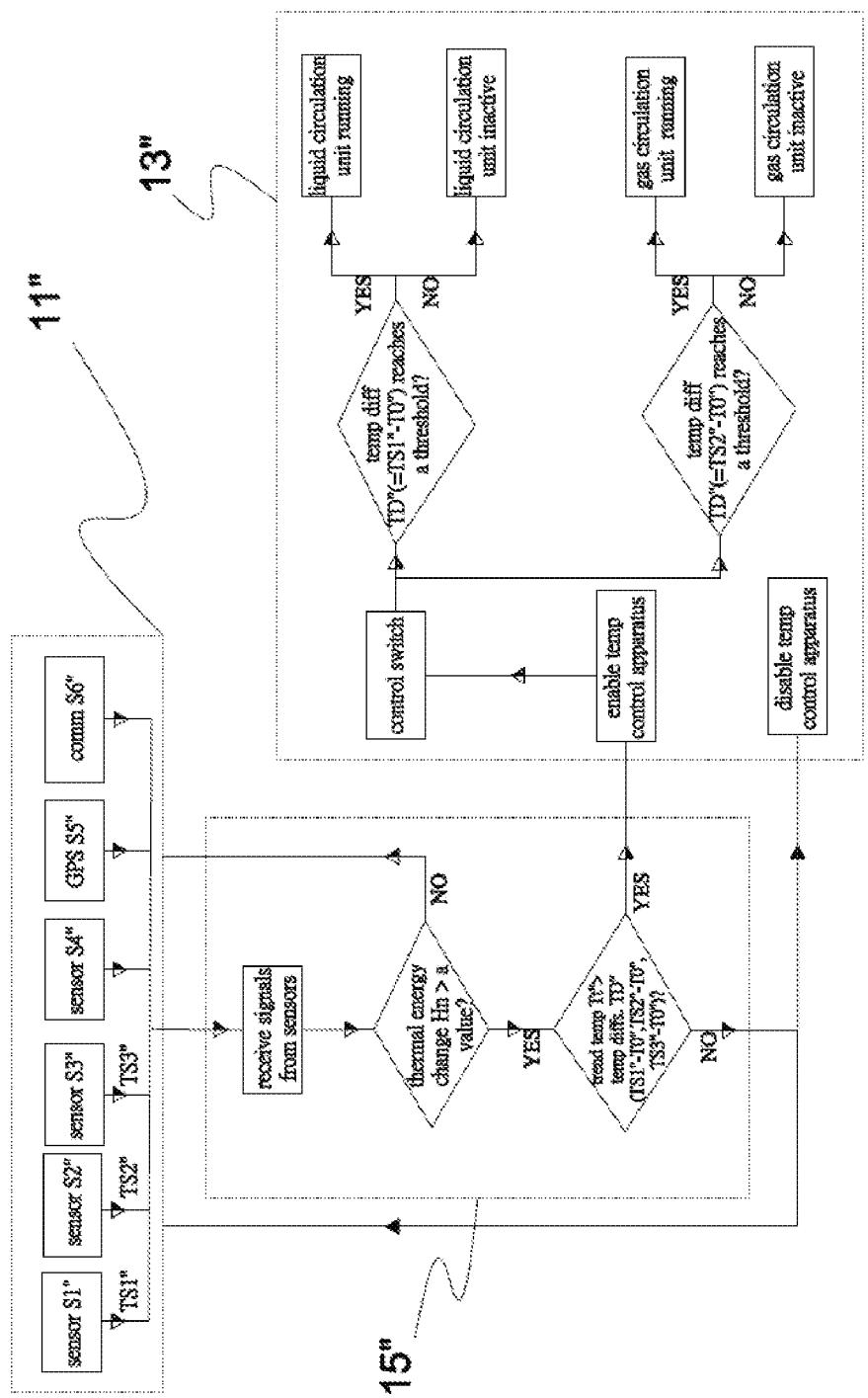
FIG. 10 shows a flowchart, which illustrates a control methodology for the air conditioning system of the third embodiment.

FIGS. 9 and 10 show a third embodiment of the present invention. The carrier 3" is a long-distance train consisting of multiple cabins. Each cabin of the train is provided with an air conditioning system 1", which facilitates adding additional cabins to the train or removing unnecessary cabins form the train, and thus the transport capacity of the train can be adjusted more flexibly. Each air conditioning system 1", which has the same structure and function, can be controlled individually or synchronously with other systems without hindering implementation of the present invention. The following paragraph will illustrate one air conditioning system and omit the contents of this embodiment that are the same as those of the previous embodiments. In this embodiment, the train may travel across continents to transport passengers and/or cargos; in particular, the train may travel across a wide range of latitudes or multiple climate zones. As shown, the data collecting apparatus 11" includes an ambient temperature sensor 117", a GPS (Global Positioning System) receiver 119", and a communication device 121". The temperature sensor 117" can measure external temperature signals (S4") and send the signal to the microcontroller 15". The GPS receiver 119" can send position signals (S5") of the train to the microcontroller 15". The communication device 121" is connected with the microcontroller 15" and can receive weather information signals (S6").

The ambient temperature sensor 117" is installed at an outer surface of a cabin for measuring the external environmental temperature, and for outputting the corresponding signals (S4"). The GPS receiver 119" can decide the position of the train and send the corresponding signals (S5") to the microcontroller 15", which in turn can predict the temperature of a next destination according to historical temperature data stored in a database. Furthermore, the communication device 121" can receive the weather information signals (S6") from a weather unit and send the signals to the microcontroller 15". Thereafter, the microcontroller 15" can estimate the change of thermal energy (Hn") in the cabin 33" and the trend temperature (Tt") based on the temperature (TS1") corresponding to the signals (S1") sent from the internal installation temperature sensors, the temperature (TS2") corresponding to the signals (S2") sent from the compartment temperature sensor, and the temperature (TS3") corresponding to the signals (S3") sent from the object sensors. According to the temperature difference (TD") between the temperatures (TS1", TS", TS3") measured by the sensors and a predetermined temperature (T0"), the microcontroller 15" decides whether or not to enable the temperature control apparatus 13". As such, the air conditioning system 1" can perform temperature control more smartly and accurately.

In this embodiment, one or more pieces of the internal installation (not labeled), such as the seats, may define a chamber, in which a phase change material (PCM) can be provided. The phase change material refers to a material with high latent heat of fusion. The material, which releases/gains isothermal energy during the phase transitions and has a large storage capacity, facilitates the air conditioning system 1" to perform temperature control. For example, when a seat is subject to a high temperature, the phase change material can absorb heat to restrain temperature rise until the material has been totally transformed from solid phase to liquid phase. After the phase change material fully becomes liquid, an increase in temperature would cause the air conditioning system 1" to be turned on to perform temperature control. On the other hand, when the phase change material in liquid state is subject to a low temperature, the material can release heat to restrain temperature drop until the material fully become solid. Thereafter, the air conditioning system 1" can be started to perform temperature control.

The air conditioning system of the present invention is not limited to the above embodiments. The system can be widely applied to various types of carriers, including vehicles, ships, aircrafts, and any devices that need temperature control. Most people have the experience: when an aircraft was parked at an airport apron, the temperature within the aircraft cabin was usually adjusted through an air-conditioned car that can send cold air into the aircraft. However, this way of temperature adjustment is usually complained about by passengers because of low efficiency, particularly when the aircraft exposed under strong sunlight. According to the present invention, the air conditioning system of an aircraft includes a liquid circulation system capable of being connected with an external heat exchange tank, as illustrated in the second embodiment. As such, before the aircraft takes off, the temperatures of the air and internal installation in the compartment of the aircraft can be reduced, thus increasing the comfort level of the aircraft cabin. After the air and internal installation return to their normal temperature, the liquid circulation unit of the air conditioning system can be disconnected from the external heat exchange tank.

As a summary, the present invention uses a methodology to extensively collecting temperature changes in a cabin of a carrier, so that the carrier cabin can be controlled at a predetermined temperature more efficiently, uniformly, quickly, and flexibly, and thus accurate, dynamic, and adaptive control results can be achieved, thus increasing comfort level for passengers and providing a good environment for transported goods.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the scope of the invention.

What is claimed is:

1. An adaptive air conditioning system for a cabin of a carrier that defines a compartment for accommodating at least one transported object for controlling the air and internal installation in the compartment at a predetermined temperature, the system comprising:
   data collecting apparatus including at least one internal installation temperature sensor, at least one compartment temperature sensor, and at least one object sensor, the internal installation temperature sensor capable of measuring temperature of the internal installation and outputting signals representative of the temperature of the internal installation, the compartment temperature sensor capable of measuring temperature of the air in the compartment and outputting signals representative of the temperature of the air in the compartment, the object sensor capable of sensing condition of the transported object and outputting signals representative of the condition of the transported object;
   temperature control apparatus including at least one liquid circulation unit, at least one air circulation unit, and at least one control switch for starting the liquid circulation unit and the air circulation unit, wherein the liquid circulation unit is thermally connected to at least one of the internal installation while the air circulation unit is thermally connected to the compartment; and
   a microcontroller capable of receiving the signals outputted from the internal installation temperature sensor, the compartment temperature sensor, and the object sensor, and capable of deciding whether or not to enable the temperature control apparatus according to temperature differences between the temperatures measured by the sensors and the predetermined temperature in view of temperature trends based on thermal energy changes in the cabin, and capable of commanding the control switch to start the liquid circulation unit and/or the air circulation unit according to the temperature differences if the temperature control apparatus is enabled, wherein the data collecting apparatus further includes a communication device electrically connected to the microcontroller for receiving weather information.

2. The adaptive air conditioning system of claim 1, wherein the internal installation includes seats, a dashboard, a steering wheel, storage boxes, carpets, battery boxes, and ceiling decorations.

3. The adaptive air conditioning system of claim 1, wherein the piece of the internal installation defines a chamber, in which a phase change material is provided.

4. The adaptive air conditioning system of claim 1, wherein the data collecting apparatus further includes at least one ambient temperature sensor capable of measuring temperature of outside environment and outputting signals representative of the temperature to the microcontroller.

5. The adaptive air conditioning system of claim 1, wherein the data collecting apparatus further includes a GPS receiver capable of outputting position signals of the carrier to the microcontroller.

6. The adaptive air conditioning system of claim 1, wherein the liquid circulation system contains a liquid that has a specific heat greater than air or is a phase change material to facilitate temperature control for the cabin.

* * * * *